US 9,895,651 B2

(12) United States Patent
Garfinkle et al.

(10) Patent No.: US 9,895,651 B2
(45) Date of Patent: Feb. 20, 2018

(54) APPARATUS AND METHOD FOR REDUCING OXYGEN AND INCREASING NITROGEN IN SECURE ENCLOSURE

(71) Applicants: Jeffrey Garfinkle, Baton Rouge, LA (US); Charles Michael Flowe, Orange Beach, AL (US)

(72) Inventors: Jeffrey Garfinkle, Baton Rouge, LA (US); Charles Michael Flowe, Orange Beach, AL (US)

(*) Notice: Subject to any disclaimer, the term of this patent is extended or adjusted under 35 U.S.C. 154(b) by 0 days.

(21) Appl. No.: 15/089,496

(22) Filed: Apr. 2, 2016

(65) Prior Publication Data
US 2017/0216764 A1  Aug. 3, 2017

Related U.S. Application Data

(60) Provisional application No. 62/289,201, filed on Jan. 30, 2016.

(51) Int. Cl.
*B01D 53/22* (2006.01)
*B01D 53/047* (2006.01)

(52) U.S. Cl.
CPC ........... *B01D 53/22* (2013.01); *B01D 53/047* (2013.01); *B01D 53/229* (2013.01); *B01D 2053/221* (2013.01); *B01D 2256/10* (2013.01); *B01D 2257/104* (2013.01); *B01D 2259/4525* (2013.01)

(58) Field of Classification Search
CPC .................. B01D 53/047; B01D 53/22; B01D 2053/221; B01D 2256/10; B01D 2259/4525
See application file for complete search history.

(56) References Cited

U.S. PATENT DOCUMENTS

| 3,715,860 | A | * | 2/1973 | Etsy | ...................... | B65B 25/001 |
| | | | | | | 53/434 |
| 4,675,030 | A | * | 6/1987 | Czarnecki | ............ | B01D 53/226 |
| | | | | | | 95/39 |
| 5,308,382 | A | * | 5/1994 | Prasad | ................... | B01D 53/22 |
| | | | | | | 426/418 |
| 6,113,671 | A | * | 9/2000 | Garrett | ................. | B01D 53/047 |
| | | | | | | 426/419 |
| 6,235,087 | B1 | * | 5/2001 | Chevalier | .............. | B01D 53/22 |
| | | | | | | 96/4 |
| 6,585,192 | B2 | * | 7/2003 | Beers | ....................... | A62C 3/06 |
| | | | | | | 244/135 R |

(Continued)

*Primary Examiner* — Jason M Greene
(74) *Attorney, Agent, or Firm* — Walter J. Tencza, Jr.

(57) ABSTRACT

An apparatus comprising an inert gas generator having an outlet and an inlet, and a secure enclosure having an outlet and an inlet. The outlet of the secure enclosure is connected to the inlet of the inert gas generator and the secure enclosure supplies inert gas enriched air having a first oxygen content percentage from the outlet of the secure enclosure to the inlet of the inert gas generator. The inert gas generator is configured to operate on the inert gas enriched air having a first oxygen content percentage to form inert gas enriched air having a second oxygen content percentage, wherein the second oxygen content percentage is substantially lower than the first oxygen content percentage. The inert gas generator may be a membrane inert gas generator. The inert gas generator may be a pressure swing adsorption inert gas generator. The inert gas may be nitrogen.

23 Claims, 1 Drawing Sheet

(56) References Cited

U.S. PATENT DOCUMENTS

| | | | | |
|---|---|---|---|---|
| 2010/0077921 A1* | 4/2010 | Haggerty | ............... | B01D 53/22 |
| | | | | 95/101 |
| 2014/0137598 A1* | 5/2014 | Fleming, Jr. | ........... | B01D 53/06 |
| | | | | 62/617 |
| 2014/0141139 A1* | 5/2014 | Gottschlich | ............ | B01D 53/22 |
| | | | | 426/418 |
| 2014/0326021 A1* | 11/2014 | Wagner | ................ | B01D 53/047 |
| | | | | 62/617 |
| 2017/0112171 A1* | 4/2017 | Cermak | ................ | B01D 53/22 |

* cited by examiner

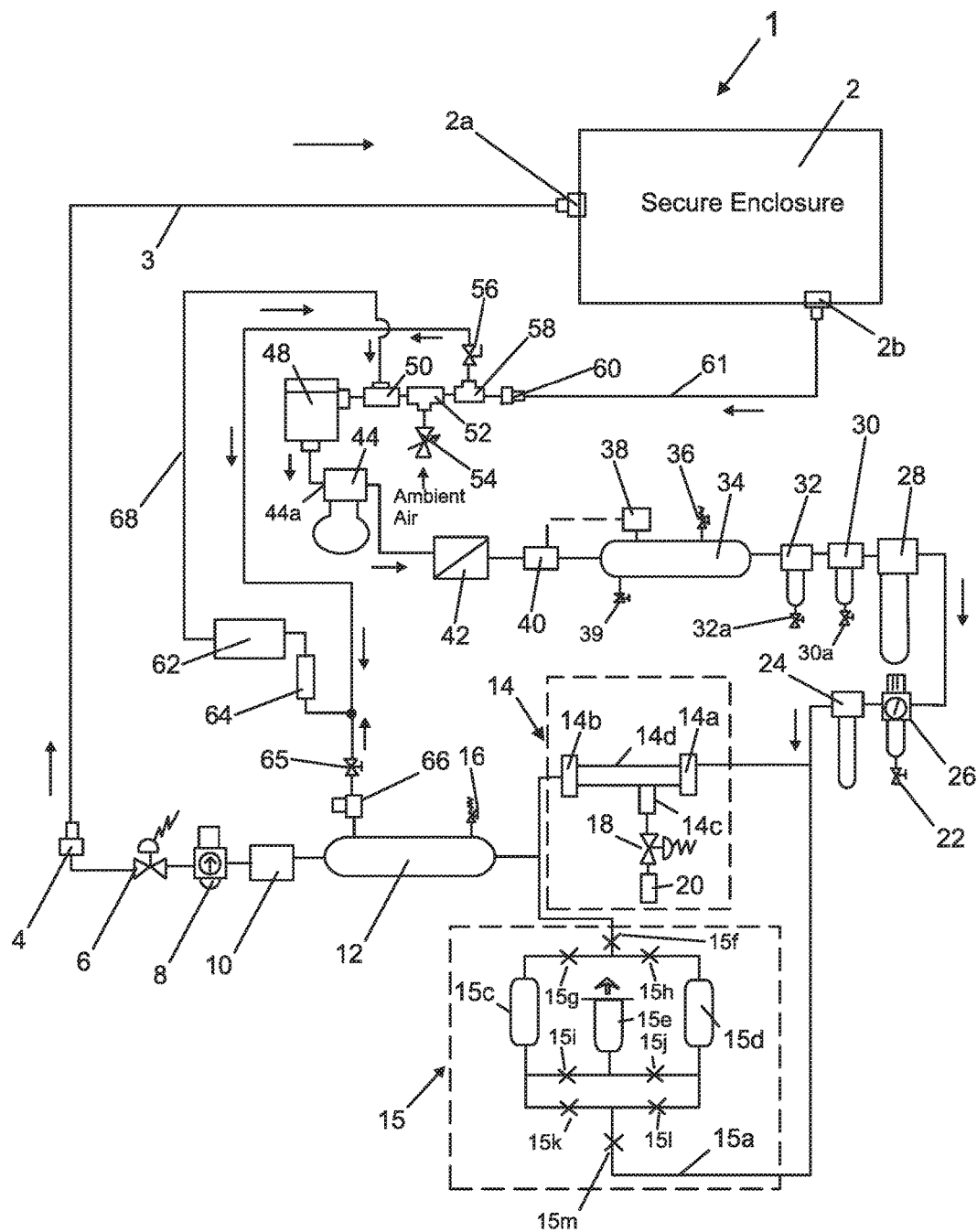

APPARATUS AND METHOD FOR REDUCING OXYGEN AND INCREASING NITROGEN IN SECURE ENCLOSURE

CROSS REFERENCE TO RELATED APPLICATION(S)

This application claims the priority of U.S. provisional patent application Ser. No. 62/289,201, filed on Jan. 30, 2016, titled "APPARATUS AND METHOD FOR REDUCING OXYGEN AND INCREASING NITROGEN IN SECURE ENCLOSURE".

FIELD OF THE INVENTION

This invention relates to improved methods and apparatus concerning preserving assets in a secure enclosure.

BACKGROUND OF THE INVENTION

There are various known techniques for attempting to preserve assets in a secure enclosure but they are inadequate.

SUMMARY OF THE INVENTION

Generally accepted science laws have been proven to state that oxygen levels below sixteen percent will not support flames, and will severely retard the opportunity for rust and corrosion to occur. One or more embodiments of the present invention provide a method, apparatus, and/or system, which reduce oxygen levels and increase the levels of an inert gas in a secure enclosure environment to subject assets within the enclosure to a inert gas-rich environment. Inert gasses are known to not support oxidation related occurrences such as rust, corrosion and flames. In particular, nitrogen is a preferred inert gas which does not support oxidation related occurrences. Other inert gasses, such as argon, by their inherent chemical qualities do not support or do not substantially support oxidation when the oxygen content is below approximately sixteen percent.

One or more embodiments of the present invention provide a method and apparatus for a self-generating, on-demand inert gas system, either mobile or stationary, to effectively lower the oxygen content of assets within a secure enclosure during shipment or storage. In at least one embodiment, a system is provided which operates on a closed loop where "normal" air is pulled into the system, and fed through one or more filters that 'clean' the air via removal of humidity, particulates, oil, hydrocarbons and other impurities. The 'cleaned' air passes through either a membrane or pressure swing adsorption (PSA) nitrogen generator or inert gas generator, that removes a predetermined (adjustable) percentage of the oxygen contained within that air and vents that waste percentage of oxygen harmlessly to the atmosphere. The remaining gas, which is now highly concentrated in nitrogen (or another inert gas used in its stead) is then reintroduced into the secure enclosure. This process continues until the ambient air within the secure enclosure reaches a predetermined oxygen level as continually measured by an oxygen analyzer.

In at least one embodiment, an apparatus is provided comprising an inert gas generator having an outlet and an inlet, and a secure enclosure having an outlet and an inlet. The outlet of the secure enclosure is connected to the inlet of the inert gas generator and the secure enclosure supplies inert gas enriched air having a first oxygen content percentage from the outlet of the secure enclosure to the inlet of the inert gas generator. The inert gas generator is configured to operate on the inert gas enriched air having a first oxygen content percentage to form inert gas enriched air having a second oxygen content percentage, wherein the second oxygen content percentage is substantially lower than the first oxygen content percentage.

The outlet of the inert gas generator may be connected to the inlet of the secure enclosure, and the inert gas generator may supply the inert gas enriched air having the second oxygen content percentage to the inlet of the secure enclosure. The inert gas generator may be a membrane inert gas generator. The inert gas generator may be a pressure swing adsorption inert gas generator. The inert gas may be nitrogen. The secure enclosure may be made substantially or entirely of a flexible material.

In at least one embodiment, a method is provided which may include reducing the oxygen content while raising the nitrogen content in a secure enclosure. Air may be removed from the secure enclosure to reduce the oxygen content; ambient air may be filtered to obtain nitrogen; and the nitrogen obtained from the ambient air is inserted into the secure enclosure to raise the nitrogen content in the secure enclosure.

In at least one embodiment, nitrogen may be obtained from the air removed from the secure enclosure and the nitrogen obtained is inserted into the secure enclosure to raise the nitrogen content in the secure enclosure.

BRIEF DESCRIPTION OF THE DRAWINGS

FIG. 1 shows a flow schematic diagram of an apparatus, system, and/or method in accordance with an embodiment of the present invention showing both a membrane, and pressure swing adsorption including a secure enclosure with connecting conduits.

DETAILED DESCRIPTION OF THE DRAWINGS

FIG. 1 shows a diagram of an apparatus, system, and/or method 1 in accordance with an embodiment of the present invention.

The apparatus, system, and/or method 1 includes a secure enclosure 2, quick connect fittings 2a and 2b, flexible conduit 3, quick connect fitting 4, solenoid valve 6 (which is normally closed), pressure regulator and gauge (low pressure) 8, purity control regulator 10, nitrogen or other inert gas storage tank 12, air separation membrane 14 or PSA (pressure swing adsorption) device 15, a safety relief valve 16, solenoid valve 18 (which is normally closed), muffler/silencer 20, condensate drain 22, pre-filter activated carbon 24, pre-filter coalescing with regulator and pressure gauge 26, an air dryer 28, a pre filter 30, condensate drain 30a, a pre filter 32, a condensate drain 32a, an air tank 34, a safety valve 36, a pressure switch 38, a condensate drain 39, a non-return (check) valve 40, an air cooled after cooler 42, air compressor 44, air intake filter 48, a tee 50, a tee 52, a metering valve 54, a tee 58, isolation valve (normally open) 56, quick connect fitting 60, flexible conduit 61, an oxygen analyzer 62, a flow-meter (oxygen sample) 64, an isolation valve (normally closed) 65, a pressure regulator and gauge 66, and flexible tubing 68 (Oxygen, $O_2$, Analyzer Sample Tubing Return).

The secure enclosure 2, in at least one embodiment may be a soft-sided, collapsible enclosure. The secure enclosure 2 may be constructed of any of a number of known non-porous materials such as PVC (polyvinylchloride) coated nylon, polyurethane, or additional materials that while providing gas-tight enclosure, also allow by their nature a foldable mobile structure that is also lighter-weight than metal or glass structures that are generally stationary when in use. One goal in using a soft-sided or flexible enclosure for enclosure 2 is to allow for mobility of the enclosure 2 once the determined oxygen content is met and the enclosure is no longer connected to the conduits.

The apparatus, system, and/or method 1 includes a nitrogen or other inert gas generating system made up of secure enclosure 2, either of two types of nitrogen or other inert gas generators, membrane 14 and pressure swing adsorption (PSA) device 15, typically including the purification and controls described below. The apparatus, system, and/or method 1 can be either mobile or stationary. The type of controls and items of purification will change based on whether the compressor 44 is oil lubricated or oil free, and the capacity of the system and ambient conditions.

In at least one embodiment, the enclosure 2 is constructed substantially or entirely of a flexible material or soft-sided material with a very low permeation rate that is zipped up around the asset to be shipped or stored. The enclosure 2 may be made of a material that has gas-tight or air tight qualities, i.e. can enclose gasses within the enclosure 2 and prevent the escape of gasses from the enclosure 2. The enclosure 2 may be made, for example, from a pvc (polyvinyl chloride) coated nylon, or a polyurethane to ensure an air-tight seal. The enclosure 2 may be as air-tight or gas-tight as possible given conditions and materials. In at least one embodiment, it is critical that the secure enclosure 2 is air-tight.

Air is removed from the enclosure 2 and is replaced with nitrogen or other inert gas via flexible conduits from the nitrogen or other inert gas generator, such as either air separation membrane 14 or PSA (pressure swing adsorption) device 15. In one embodiment, the air that is removed may be fully discarded, and then nitrogen may be filtered through the membrane from air that has been pulled from the atmosphere. Once filtered, that nitrogen is inserted into the enclosure 2 and replaces the air that has been removed and discarded. In another embodiment, the nitrogen may be gleaned from air taken from the enclosure and filtered. This would be a closed loop system, In another embodiment, the air from the enclosure 2 and air from the atmosphere would be filtered through the membrane, the oxygen discarded and nitrogen inserted. Any of these embodiments or methods would be effective in producing a lowered oxygen environment within the secure enclosure, which is the desired outcome.

The balance of the apparatus, system, and/or method 1 may include all components shown in FIG. 1 except those numbers assigned to the secure enclosure 2 with non-return (check) valves 2a and 2b. Conduits 3 and 61 are connected to the enclosure 2 via special quick connect couplings 2a and 2b, respectively, that are built-in to the walls of the enclosure 2 through special non-return valve, which are a built-in part of the quick couplings 2a and 2b. The other end of the conduits 3 and 61 connects to apparatus, system, and/or method 1, pneumatic quick couplers 4 and 60 respectively, for both the supply conduit 3 and the return conduit 61. Ambient Air and nitrogen gas or other inert gas from the return of the secure enclosure are blended via metering valve 54 to create the necessary vacuum in the secure enclosure 2. This is achieved by using a multi-turn metering valve (either manual or remotely actuated) 54 that throttles the amount of ambient air entering the compression chamber 44a of the air compressor 44, through the air intake filter 48, preferentially allowing the entire capacity of nitrogen or other inert gas enriched gas from the nitrogen or inert gas generator 14 or 15. Mixing of the gaseous contents of the secure enclosure 2 with the nitrogen gas or other inert gas delivered by the nitrogen or other inert gas generator 14 or 15 lowers the oxygen content in the secure enclosure 2. This causes the nitrogen or other inert gas generator 14 or 15 inlet oxygen content (of the blended mixture) to be lower than that contained in normal ambient air. The result is an acceleration of the lowering of the oxygen content in the secure enclosure 2, because the membrane or PSA technology used will not have as much oxygen to remove. This acceleration effect will rapidly increase the longer it runs.

The air compressor 44 compresses a gas stream to a pressure appropriate for the system limits and performance. The pressure limitations are dictated by the membrane or PSA nitrogen or other inert gas generator manufacturer. Typical pressures are in the 125-150 psiG (pounds per square inch gauge) range, although pressures can vary, due to design from 50-350 psiG (pounds per square inch gauge). Air is cooled via an air cooled after cooler heat exchanger 42 that removes condensate from the compressed air stream by lowering the temperature of the air prior to entering into the filtration and separation system. The resulting condensate is collected in the air tank 34 and drained via valve 39. Prior to entering the air tank 34, the air passes through a non-return valve 40 that keeps air pressure in the air tank 34 when the system is stopped.

Prior to the inlet to the air separation membrane 14 or PSA 15, the compressed air flows through a multi-stage air purification system, which includes which components in FIG. 1. The method, system and/or apparatus 1 includes the pre-filter 32, which may have a performance and efficiency of 0.1 micron (0.03 ppmW (parts per million by weight) with low pressure drop across the filter and to remove bulk liquids, oil aerosol and larger particulate that would cause premature clogging of higher efficiency filters in the apparatus. The pre-filter 30 may be a 0.01 micron (0.008 ppmW) for removal of nearly all traces of compressor lubricants in the aerosol state, along with smaller particulate with low pressure drop across the filter. Next, the air passes through an air dryer 28 to remove water vapor from the compressed air that could otherwise condense prior to entering either nitrogen or other inert gas generator type 14 or 15. Various methods can be used to provide air at the dew point needed for the technology (Membrane 14 or PSA 15) used and for the size and operating conditions equipment that will be used. Pressure Swing Adsorption (PSA) would require a minimum of thirty-nine degrees Fahrenheit dew point at operating pressure unless operating ambient is lower than thirty-two degrees Fahrenheit in which case a desiccant dryer would be utilized and would be designed for a minimum of eighteen degrees Fahrenheit lower than the lowest ambient the equipment would be exposed to. Another preferred method is using an air circulation heater to heat the compressed air above the lowest ambient temperature the equipment will be exposed to by a minimum of 18° F. above the lowest ambient temperature. This effectively lowers the relative humidity and carries moisture through the membrane 14 or PSA 15 in the vapor state. Both the PSA and membrane technologies will effectively remove water in the vapor state to an atmospheric dew point in the range of negative forty degrees Fahrenheit to negative one hundred degrees Fahrenheit, depending on the residence time and percentage of oxygen remaining in the gas stream. The lower the oxygen content the lower the dew point. Next the apparatus 1 may contain a combination filter regulator 26 with performance and efficiency of 0.01 micron (0.01 ppmW) to effectively remove any carryover of desiccant dust, if a desiccant dryer is used in the apparatus. Due to size and capacity of the air and nitrogen or other inert gas systems in the apparatus 1, the air pressure regulator part of filter 26 may be supplied as a separate item. Additionally, an activated carbon filter 24 may be installed if the compressor is oil lubricated. If the compressor 44 is oil free, filter 24 would not be required.

Compressed, filtered and dried air enters the nitrogen or other inert gas generator 14 or 15 where the constituents of ambient air are selectively removed from the air stream, leaving primarily nitrogen gas or other inert gas. The remaining amount of oxygen and other constituents are controlled by the flow volume and the selectivity of either nitrogen or other inert gas generating technology going through the nitrogen or other inert gas generator 14 or 15, lower flow resulting in higher nitrogen or other inert gas content, and lowered oxygen content. Nitrogen or other inert gas enriched gas is delivered from the nitrogen or other inert gas generator 14 or 15, into the nitrogen or other inert gas reservoir 12 and flows into a flow controller (purity controller) 10 that will maintain a near constant flow under a wide range of operating conditions downstream. Surges downstream flow would cause the oxygen content to deteriorate to unacceptable levels. The controller 10 used maintains a steady flow, resulting in maintaining the desired oxygen levels in the final product. Next is a pressure reducing valve (pressure regulator) 8 that prevents the downstream pressure from exceeding the pressure capabilities of the secure enclosure 2. Next is an electrically operated valve 6 that is normally closed and is used to stop the flow of nitrogen or other inert gas into the secure enclosure 2 when the nitrogen system is stopped avoiding over pressurization of the secure enclosure 2. Nitrogen or other inert gas flows to and from the secure enclosure 2 via flexible conduits 3 and 61. The secure enclosure 2 has one way valves built-in to the secure enclosure 2, at the coupler 2a and coupler 2b locations, that maintain an air tight seal holding the nitrogen or other inert gas rich environment inside the secure enclosure 2. The nitrogen or other inert gas delivered to the secure enclosure 2, via conduit 3 and coupler 2a, is on a closed loop that returns the gas to the intake of the air compressor 44 via coupler 2b, and conduit 61. The performance of the nitrogen or other inert gas generator 14 or 15 is greatly enhanced by preferentially reintroducing 100% of the nitrogen or other inert gas gas delivered back into the intake of the air compressor 44 with the balance of make-up air coming from the atmosphere through valve 54. This results in an acceleration effect, where the nitrogen or other inert gas percentage feeding the nitrogen or other inert gas generator 14 or 15 is rapidly increasing which in turn causes the nitrogen or other inert gas percentage leaving the nitrogen or other inert gas generator 14 or 15 to increase in purity which causes the process of lowering the oxygen content in the secure enclosure 2 to be much faster than if the feed gas to compressor inlet 44a to the nitrogen or other inert gas generator 14 or 15 was one hundred percent ambient air, which is what a typical nitrogen or other inert gas generator would use. In at least one embodiment, this aspect is important and critical. What enables this process to be able to create the acceleration effect is the strategic placement of the metering valve 54 that is throttled to create a slight vacuum coming from the secure enclosure 2. This metering valve 54 can be either manual, automatic or semi-automatic depending on the degree of automation required in a specific project or application.

In at least one embodiment, the metering valve 54 is adjustable, so if user wants the secure enclosure 2 to form fit to the products it is protecting or to have a slightly pressurized secure enclosure 2, if the user desires. Oxygen content in the secure enclosure 2 is measured by the oxygen analyzer 62 with its main pickup point positioned in the return line 61 from the secure enclosure 2. The oxygen sample is also on a closed loop utilizing the vacuum created by the metering valve 54 which in the vacuum state will pull the sample through the analyzer 62.

In at least one embodiment (membrane type 14), it is critical that a solenoid or other type actuated valve 18 be used to close when the system is stopped and what this valve 18 does is keep the membrane 14 pressurized when stopped for the purpose of a quick start up once the apparatus, system and/or method 1 is restarted. Normally, due to the design of air separation membranes, there is a feed gas inlet number 14a, a product gas outlet 14b and a permeate port 14c. The permeate port 14c is where the waste gas containing oxygen enriched gas is discharged from the system 1. When system 1 is running, pressure inside the membrane housing 14d, is at or near atmospheric pressure. When the system 1 is stopped, the membrane housing 14d remains at line pressure, (actual pressure will vary depending on the project specifications) until started again. To eliminate excessive noise when re-starting the nitrogen or other inert gas system 1 we have fitted the valve 18 with a silencer muffler 20.

In another embodiment (PSA type 15) gas enters port 15a and goes into either vessel 15c or 15d depending on where in the standard sequence of the PSA 15 is at. This type of system uses a carbon molecular sieve (CMS) (not shown) that is packed inside the vessels 15c and 15d. Each vessel is either generating, equalizing, purging and or regenerating depending on the built-in timing of a PLC (not shown) or other similar apparatus. The switching valves 15f, 15g, 15h, 15i, 15j, 15k, 15l, and 15m will open and close depending on where in the sequence the PSA 15 is in. Simply put one vessel 15c or 15d is pressurized and online producing nitrogen or other inert gas and the other is venting through the silencer(s) 15e. The vessels 15c or 15d, in at least one embodiment, switch every forty to sixty seconds, the time depending on design considerations. Details on the sequence and operation of the process valves 15f-15m need not be covered here for one or more embodiments of the present application, because these details vary from one manufacturer to another, and are part of existing PSA nitrogen or other inert gas generator configurations available in the marketplace.

One possible embodiment would be a mobile apparatus, system, and/or method 1 in which all the components of the apparatus, system, and/or method 1 are located inside an equipment enclosure (not shown—different from enclosure 2) with wheels for portability. This creates a need for specific component placement inside the portable enclosure of the complete equipment or generator part of the apparatus, method, and/or system 1 that will not cause detrimental issues. The muffler silencer 20 or 15d discharges oxygen enriched gas into the equipment enclosure (not Shown) and must be placed in an area where this waste gas containing high concentration of oxygen cannot be re-entrained in the inlet 44a of the air compressor 44. In the event of re-entering of this permeate or waste gas, the nitrogen or other inert gas purity (Oxygen content) would be negatively affected.

Since, the apparatus, system, and/or method 1, in one or more embodiments, operates over a large scope of capacities required by individual users, smaller and larger systems will be required for all the applications for the technology of one or more embodiments of the present invention. The system, method, and/or apparatus 1 in one or more embodiments, may need to be stationary. However, this nitrogen or other inert gas generation technology may be used in a mobile or stationary form, or a small or a large form while maintaining all or some of the functions of one or more embodiments of the present invention, in other words upward and downward scaleable.

In operation, in at least one embodiment, the dedicated air compressor 44 draws in both ambient air via valve 54, and nitrogen or other inert gas enriched air via connecting conduit 61, the quick connect fitting 60, tees 50, 52, and 58 entering through intake filter 48, and into the compressor suction port 44a which results in an acceleration of the removal of oxygen gas from the secure enclosure 2. As this acceleration effect is going on in process, the oxygen content leaving the membrane nitrogen or other inert gas generator 14 or Pressure Swing Adsorption (PSA) nitrogen or other inert gas generator 15 is very rapidly lowered. The ambient air is required, in at least one embodiment, due to the nitrogen or other inert gas recovery percentage of the generator's intake being in the 25% to 50% range depending on the nitrogen or other inert gas purity required by the individual users of the apparatus, method, and/or system 1. For example, Initially the nitrogen or other inert gas generator 14 or 15 would run at 5% oxygen ($O_2$) content since the inlet number 14a or 15m in FIG. 1 to the generator 14 or 15 in FIG. 1, has approximately 21% oxygen. However, once the secure enclosure 2 is being fed with nitrogen or other inert gas gas with 5% ($O_2$) the return gas will have a much lower ($O_2$) content returning from the secure enclosure 2 via conduit 61, the nitrogen or other inert gas generator 14 or 15 does not have to remove as much oxygen from the feed gas located at number 14a or 15m in FIG. 1, dramatically improving the oxygen percentage that is being delivered to the secure enclosure 2. For example, if a customer requires a purity inside the secure enclosure 2 to be 10% oxygen ($O_2$) content remaining, we would set up system for about 5% oxygen ($O_2$) content with recycle of return gas and approximately 50% of the make-up gas will be from the ambient air through valve 54.

In one use, the apparatus 1 shown in FIG. 1, may be used for the protection of catalysts during transport or storage pending their conditioning for re-use or disposal. Catalysts are used by gas plants and oil refineries and other types of plants to quick start machinery and save on fuel costs. When plants shut down to perform 'turnarounds' once or twice a year to clean machinery and make sure the operation is running efficiently, they must remove the catalysts and store them. The challenge is that catalysts are extremely combustible when oxidation occurs. The apparatus, method, and/or system 1 of FIG. 1, can protect from these occurrences when the catalysts are stored in SecurePacs (trademarked) or a plurality of secure enclosures similar to or identical to secure enclosure 2, and conditioned with the apparatus, method and/or system 1 of FIG. 1 to create a low-oxygen environment. The catalysts used may be petroleum refining catalysts and chemical processing catalysts. Catalysts typically, have a pyrophoric nature, i.e. they react to oxygen and cause fires when they do so.

Once the desired oxygen level has been achieved, the conduits 3 and 61, shown in FIG. 1, may be detached from the enclosure valves 2a and 2b, respectively. This separation allows for the mobility of the secure enclosure 2 as a stand alone enclosure allowing for transport or storage of the enclosure, while the oxygen-lowering system is either conditioning other similar enclosures, or is stored pending future use.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus comprising
a device configured to receive a first mixture;
a cooler having an input and an output, wherein the device configured to receive the first mixture is connected to the input of the cooler, and wherein the cooler operates on the first mixture by lowering the temperature of the first mixture to thereby remove at least some condensate;
an oxygen removal device having an input and an output, wherein the output of the cooler is connected to the input of the oxygen removal device, and wherein the oxygen removal device operates on the first mixture to remove at least some oxygen, after the first mixture has been operated on by the cooler;
a flexible secure enclosure having an input, wherein the output of the oxygen removal device is connected to the input of the flexible secure enclosure, and wherein the first mixture is supplied to the secure enclosure through the input of the flexible secure enclosure, after the first mixture has been operated on by the oxygen removal device; and
an adjustable metering valve configured to cause the flexible secure enclosure to form fit to products within the flexible secure enclosure, wherein the products are not in a gaseous state.

2. The apparatus of claim 1 further comprising
a first filter having an input and an output, wherein the output of the cooler is connected to the input of the first filter, wherein the output of the first filter is connected to the input of the oxygen removal device, wherein the first filter has a performance and efficiency of a first amount in parts per million by weight, and operates on the first mixture to filter out at least some particulate, after the first mixture has been operated on by the cooler, and before the first mixture has been operated on by the oxygen removal device.

3. The apparatus of claim 2 further comprising
a dryer having an input and an output, wherein the output of the first filter is connected to the input of the dryer, wherein the output of the dryer is connected to the input of the oxygen removal device and wherein the dryer operates on the first mixture to heat the first mixture to remove at least some water vapor, after the first mixture has been operated on by the first filter, and before the first mixture has been operated on by the oxygen removal device.

4. The apparatus of claim 1 wherein
the flexible secure enclosure has an output, wherein the output of the flexible secure enclosure is connected to the device configured to receive the first mixture, wherein the first mixture includes gas supplied from the output of the flexible secure enclosure.

5. The apparatus of claim 1 wherein
after the first mixture has been operated on by the oxygen removal device, the first mixture is primarily an inert gas.

6. The apparatus of claim 5 wherein
the inert gas is nitrogen.

7. The apparatus of claim 1 further comprising
a first valve; and
an air tank having an input, a first output, and a second output, wherein the input of the air tank is connected to the output of the cooler, the first output of the air tank is connected to the input of the oxygen removal device, and the second output of the air tank is connected to the first valve, and wherein the air tank collects at least some condensate, and at least some condensate collected by the air tank is drained via the first valve, after the first mixture has been operated on by the cooler and before the first mixture has been operated on by the oxygen removal device.

8. The apparatus of claim 3 further comprising
a second filter having an input and an output, wherein the input of the second filter is connected to the output of the dryer, and wherein the output of the second filter is connected to the input of the oxygen removal device, wherein the second filter is an activated carbon filter which operates on the first mixture after the first mixture has been operated on by the dryer, and before the first mixture has been operated on by the oxygen removal device.

9. A method comprising
receiving a first mixture, wherein the first mixture includes ambient air;
lowering the temperature of the first mixture to thereby remove at least some condensate;
filtering out at least some particulate from the first mixture, with a performance and efficiency of a first amount in parts per million by weight, after the temperature of the first mixture has been lowered;
heating the first mixture to remove at least some water vapor, after at least some particulate has been filtered out from the first mixture;
removing at least some oxygen from the first mixture, after the first mixture has been heated to remove at least some water vapor; and
supplying the first mixture to a flexible secure enclosure after at least some oxygen has been removed from the first mixture;
wherein products are contained within the flexible secure enclosure, wherein the products are not in a gaseous state; and
further comprising causing the flexible secure enclosure to form fit to the products within the flexible secure enclosure.

10. The method of claim 9 wherein
filtering out at least some particulate from the first mixture, with a performance and efficiency of a second amount in parts per million by weight, after at least some particulate has been filtered out from the first mixture with a performance and efficiency of the first amount in parts per million by weight, and before the first mixture has been heated to remove at least some water vapor.

11. The method of claim 9 wherein
the first mixture includes gas supplied from an output of the flexible secure enclosure.

12. The method of claim 9 wherein
the first mixture supplied to the flexible secure enclosure, after at least some oxygen has been removed, is primarily an inert gas.

13. An apparatus comprising
a device configured to receive a first mixture, wherein the first mixture includes ambient air;
a cooler having an input and an output, wherein the device configured to receive the first mixture is connected to the input of the cooler, and wherein the cooler operates on the first mixture by lowering the temperature of the first mixture to thereby remove at least some condensate;
a first filter having an input and an output, wherein the output of the cooler is connected to the input of the first filter, and wherein the first filter has a performance and efficiency of a first amount in parts per million by weight, and operates on the first mixture to filter out at least some particulate, after the first mixture has been operated on by the cooler;
a dryer having an input and an output, wherein the output of the first filter is connected to the input of the dryer, and wherein the dryer operates on the first mixture to heat the first mixture to remove at least some water vapor, after the first mixture has been operated on by the first filter;
an oxygen removal device having an input and an output, wherein the output of the dryer is connected to the input of the oxygen removal devices, and wherein the oxygen removal device operates on the first mixture to remove at least some oxygen, after the first mixture has been operated on by the dryer; and
a flexible secure enclosure having an input, wherein the output of the oxygen removal device is connected to the input of the flexible secure enclosure, and wherein the first mixture is supplied to the flexible secure enclosure through the input of the flexible secure enclosure, after the first mixture has been operated on by the oxygen removal device; and
an adjustable metering valve configured to cause the flexible secure enclosure to form fit to products within the flexible secure enclosure, wherein the products are not in a gaseous state.

14. The apparatus of claim 13 further comprising
a second filter having an input and an output, wherein the output of the first filter is connected to the input of the second filter, and wherein the second filter has a performance and efficiency of a second amount in parts per million by weight, and operates on the first mixture to filter out at least some particulate, after the first mixture has been operated on by the first filter, and before the first mixture has been operated on by the dryer, and wherein the second amount is substantially smaller than the first amount.

15. The apparatus of claim 13 wherein
the flexible secure enclosure has an output, wherein the output of the flexible secure enclosure is connected to the device configured to receive the first mixture, wherein the first mixture includes gas supplied from the output of the flexible secure enclosure.

16. The apparatus of claim 13 wherein
after the first mixture has been operated on by the oxygen removal device, the first mixture is primarily an inert gas.

17. The apparatus of claim 13 wherein
after the first mixture has been operated on by the oxygen removal device, the first mixture is primarily nitrogen.

18. The apparatus of claim 13 further comprising
a first valve; and
an air tank having an input, a first output, and a second output, wherein the input of the air tank is connected to the output of the cooler, the first output of the air tank is connected to the input of the first filter, and the second output of the air tank is connected to the first valve, and wherein the air tank collects at least some condensate, and at least some condensate collected by the air tank is drained via the first valve, after the first mixture has been operated on by the cooler and before the first mixture has been operated on by the first filter.

19. The apparatus of claim 14 further comprising
a third filter having an input and an output, wherein the input of the third filter is connected to the output of the dryer, and wherein the output of the third filter is connected to the input of the oxygen removal device, wherein the third filter is an activated carbon filter which operates on the first mixture after the first mixture has been operated on by the dryer, and before the first mixture has been operated on by the oxygen removal device.

20. The method of claim 9 wherein
the first mixture supplied to the flexible secure enclosure, after at least some oxygen has been removed, is primarily nitrogen.

21. The method of claim 9 further comprising
zipping up the flexible secure enclosure around the products.

22. The apparatus of claim 1 wherein
the flexible secure enclosure is configured to be zipped up around the products.

23. The apparatus of claim 13 wherein
the flexible secure enclosure is configured to be zipped up around the products.

* * * * *